(12) United States Patent  (10) Patent No.: US 8,988,801 B2
Chan et al.  (45) Date of Patent: Mar. 24, 2015

(54) METHOD AND SYSTEM FOR MEASURING NOISE OF A MAGNETIC HEAD

(71) Applicant: SAE Magnetics (H.K.) Ltd., Hong Kong (CN)

(72) Inventors: Wahchun Chan, Hong Kong (CN); Tszlok Cheng, Hong Kong (CN); Shengqiang Chen, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 14/506,848

(22) Filed: Oct. 6, 2014

(65) Prior Publication Data

US 2015/0023144 A1   Jan. 22, 2015

Related U.S. Application Data

(62) Division of application No. 12/923,289, filed on Sep. 13, 2010.

(30) Foreign Application Priority Data

Jul. 23, 2010  (CN) .......................... 2010 1 0240216

(51) Int. Cl.
  *G11B 5/00*  (2006.01)
  *G11B 17/00*  (2006.01)
  *G11B 27/36*  (2006.01)
  *G11B 5/455*  (2006.01)
  *G11B 5/39*  (2006.01)

(52) U.S. Cl.
  CPC . *G11B 5/455* (2013.01); *G11B 5/39* (2013.01)
  USPC ............................. 360/31; 360/76; 360/97.19

(58) Field of Classification Search
  CPC .... G11B 27/36; G11B 5/012; G11B 2220/20; G11B 5/09; G11B 5/584; G11B 33/08; G11B 25/043
  USPC .............. 360/31, 46, 67, 75, 76, 97.19, 97.16
  See application file for complete search history.

(56) References Cited

U.S. PATENT DOCUMENTS 5,134,366 A    7/1992  Kirk
5,668,477 A    9/1997  Mahmoudian et al.
5,854,554 A   12/1998  Tomita et al.

(Continued)

OTHER PUBLICATIONS

Office Action issued on Nov. 20, 2014 in related U.S. Appl. No. 12/923,289, 14 pages.

*Primary Examiner* — Nabil Hindi
(74) *Attorney, Agent, or Firm* — Nixon & Vanderhye PC

(57) ABSTRACT

A method for measuring noise of a magnetic head includes setting a plurality of threshold values, applying bias current or voltage to a read element of the magnetic head, applying an external transverse magnetic field to the magnetic head, amplifying output signal from the read element to produce an amplified signal, filtering the amplified signal to produce a filtered signal, generating an enable signal for each threshold value in a predetermined time window by a counting control means with input signals which include the filtered signal and the threshold value, measuring the cumulative time duration of each enable signal, making an amplitude-duration distribution according to the cumulative time durations and the threshold values, calculating a plurality of parameters according to the amplitude-duration distribution and analyzing the parameters with a plurality of predetermined criteria to determine the defects of the magnetic head. Accordingly, the invention also discloses a system for measuring noise of a magnetic head.

11 Claims, 8 Drawing Sheets

(56) References Cited

U.S. PATENT DOCUMENTS 6,738,208 B2 5/2004 Dakroub
7,417,423 B2 8/2008 Sudou
7,679,856 B2 * 3/2010 Ishiguro .......................... 360/75
2003/0038626 A1 2/2003 Carrington et al.
2012/0019945 A1 1/2012 Chan et al.

* cited by examiner

METHOD AND SYSTEM FOR MEASURING NOISE OF A MAGNETIC HEAD

CROSS REFERENCES TO RELATED APPLICATIONS

This application is a divisional of application Ser. No. 12/923,289 filed Sep. 13, 2010, which claims priority to Chinese Application No. 201010240216.7 filed Jul. 23, 2010, the entire contents of each of which is hereby incorporated by reference in this application.

FIELD OF THE INVENTION

The present invention relates to noise-measuring method and system and, particularly, to a method and system for measuring noise of a magnetic head with a magnetoresistive (MR) read element.

BACKGROUND OF THE INVENTION

One known type of information storage device is a disk drive device that uses magnetic media to store data and a magnetic head that is positioned over the magnetic media to selectively read from or write to the magnetic media.

Ordinarily, a magnetic head consists of a magnetoresistive effect (MR) read element (Reader) and an inductive write element (Writer), while some further include a heating unit (Heater). Magnetic head with a magnetoresistive (MR) read element is widely used to hard disk drive (HDD) to increase in capacity and reduce in size. Since then, several types of MR read element have been widely used by disk drive manufacturers in succession. One is anisotropic magnetoresistive (AMR) element, which makes the angle between the magnetization direction and the direction of sense current flowing through the MR element change and, in turn, cause a change the resistance of the MR element and a corresponding change in the sensed current or voltage. Another type is giant magnetoresistive (GMR) element manifesting the GMR effect. The GMR effect is a phenomenon that the magnetoresistive ratio (MR ratio) will change under an external magnetic field. The GMR element comprises two ferromagnetic layers and a non-ferromagnetic layer sandwiched between the two ferromagnetic layers. The resistance of the non-ferromagnetic layers varies with the magnetic moments of the ferromagnetic layers, the conduction electrons and the spin-dependent scattering. Still another type of MR sensor is tunnel magnetoresistive (TMR) element, which has become the mainstream MR element due to its more remarkable change of MR ratio by replacing AMR element and GMR element.

At each test after manufacturing the magnetic head, it is necessary to confirm that the finished magnetic head with an MR element is a good article and may not produce unacceptable noise. However there are many mechanisms generating noise in an MR read element, some are magnetic in nature and some are electrical in nature. The Barkhausen Noise, Random Telegraph Noise or Popcorn Noise indicates instability in an MR read element. Instability related noise tends to be a catastrophic problem rather than a contribution to background noise that can limit SNR, thus, it is necessary to handle them with different criteria respectively.

In the art today, different methods and systems are developed to measure noise in MR heads. The prevalent method is to use a digitizer to convert analog signal to digital signal, and by using a processor to analyze all original digitized signal as a whole and hence to identify whether the magnetic head produces noise. This conventional method does not handle instability related noise and background noise respectively, thus it is inadequate to identify true defects accurately. Furthermore, since the noise of a magnetic head may contain high frequency components, in order to capture such noise, the digitizer sampling frequency needs to be high enough. That increases testing cost. At the same time, the huge amount of digitized signal generated by the high speed digitizer takes a pretty long time to transfer and process the digitized signal and hence a processor with high processing power and enough memory will become essential for a faster computation. This also increases testing cost. All these are not in favor of the reduction of production costs.

In response to this, it is desired to provide a method to handle instability related noise and background noise respectively and a corresponding system to identify true defects fast and accurately to gain better cost-effectiveness to overcome the above-mentioned drawbacks.

SUMMARY OF THE INVENTION

One objective of the present invention is to provide a method for measuring noise of a magnetic head with a magnetoresistive (MR) read element. The noise-measuring method can handle instability related noise and background noise respectively to identify true defects accurately and can be easily implemented to gain better cost-effectiveness.

Another objective of the present invention is to provide a system for measuring noise of a magnetic head with a magnetoresistive (MR) read element. The noise-measuring system can handle instability related noise and background noise respectively to identify true defects accurately and gain better cost-effectiveness by using some lower cost devices.

To achieve above objectives, one aspect of the present invention relates to a method for measuring noise of a magnetic head. The method includes setting a plurality of threshold values, applying bias current or voltage to a read element of the magnetic head, applying an external time-changing transverse magnetic field to the magnetic head, amplifying output signal from the read element to produce an amplified signal, filtering the amplified signal to produce a filtered signal, generating an enable signal for each threshold value in a predetermined time window by a counting control means with input signals which includes the filtered signal and the threshold value, measuring the cumulative time duration of each enable signal, making an amplitude-duration distribution according to the cumulative time durations and the threshold values, and calculating a plurality of parameters according to the amplitude-duration distribution and analyzing the parameters with a plurality of predetermined criteria to determine the defects of the magnetic head.

To achieve above objectives, another aspect of the present invention relates to a method for measuring noise of a magnetic head. The method includes setting a plurality of threshold values, applying bias current or voltage to a read element of the magnetic head, applying an external constant transverse magnetic field to the magnetic head, amplifying output signal from the read element to produce an amplified signal, filtering the amplified signal to produce a filtered signal, generating an enable signal for each threshold value in a predetermined time window by a counting control means with input signals which includes the filtered signal and the threshold value, measuring the cumulative time duration of each enable signal, making an amplitude-duration distribution according to the cumulative time durations and the threshold values, and calculating a plurality of parameters according to the amplitude-duration distribution and analyzing the parameters with a plurality of predetermined criteria to determine the defects of the magnetic head.

To achieve above objectives, still another aspect of the present invention relates to a method for measuring noise of a magnetic head. The method includes obtaining a plurality of first parameters, obtaining a plurality of second parameters and analyzing the relationship between the first parameters and the second parameters with a plurality of predetermined criteria to determine the defects of the magnetic head. Wherein obtaining the first parameters by a method including setting a plurality of first threshold values, applying first bias current or voltage to a read element of the magnetic head, applying an external constant transverse magnetic field to the magnetic head, amplifying first output signal from the read element to produce a first amplified signal, filtering the first amplified signal to produce a first filtered signal, generating a first enable signal for each first threshold value in a predetermined first time window by a counting control means with first input signals which includes the first filtered signal and the first threshold value, measuring the first cumulative time duration of each first enable signal, making a first amplitude-duration distribution according to the first cumulative time durations and the first threshold values, calculating the first parameters according to the first amplitude-duration distribution and obtaining a plurality of second parameters by a method including setting a plurality of second threshold values, applying second bias current or voltage to the read element of the magnetic head, applying an external time-changing transverse magnetic field to the magnetic head, amplifying second output signal from the read element to produce a second amplified signal, filtering the second amplified signal to produce a second filtered signal, generating a second enable signal for each second threshold value in a predetermined second time window by the counting control means with second input signals which includes the second filtered signal and the second threshold value, measuring the second cumulative time duration of each second enable signal, making a second amplitude-duration distribution according to the second cumulative time durations and the second threshold values, and calculating the second parameters according to the second amplitude-duration distribution.

To achieve above objectives, yet another aspect of the present invention relates to a system for measuring noise of a magnetic head. the system includes a magnetic field generator for applying an external transverse magnetic field to the magnetic head, a reader control unit for applying bias current or voltage to a read element of the magnetic head, an amplifying unit for amplifying output signal from the read element to produce an amplified signal, a filter unit for filtering the amplified signal to produce a filtered signal, a threshold control unit for setting a plurality of threshold values, a counting control unit for making and outputting a plurality of enable signals for a plurality of threshold values, a clock unit for making clock signal, a counter unit for measuring the cumulative time duration of each enable signal, an amplitude-duration distribution processing module for generating a amplitude-duration distribution according to the cumulative time durations and the threshold values, and a processor for calculating a plurality of parameters according to the amplitude-duration distribution and analyzing the parameters with a plurality of predetermined criteria to determine the defects of the magnetic head.

In comparison with the prior art, the present invention measures the time durations with a plurality of predetermined thresholds to generate an amplitude-duration distribution (histogram) in situ. For each threshold, measure the time duration of the part of the tested signal which exceeds the predetermined threshold, then a digitizer is not necessary any more, some other lower cost devices can be used to implement this measurement, also, there is a significant decrease in the amount of data and data handling time. Based on the amplitude-duration distribution, the instability related noise and background noise of the magnetic head can be measured respectively to identify true defects accurately. Accordingly, the noise-measuring system can use some lower cost devices to handle instability related noise and background noise respectively to identify true defects accurately in shorter measurement time to gain better cost-effectiveness.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
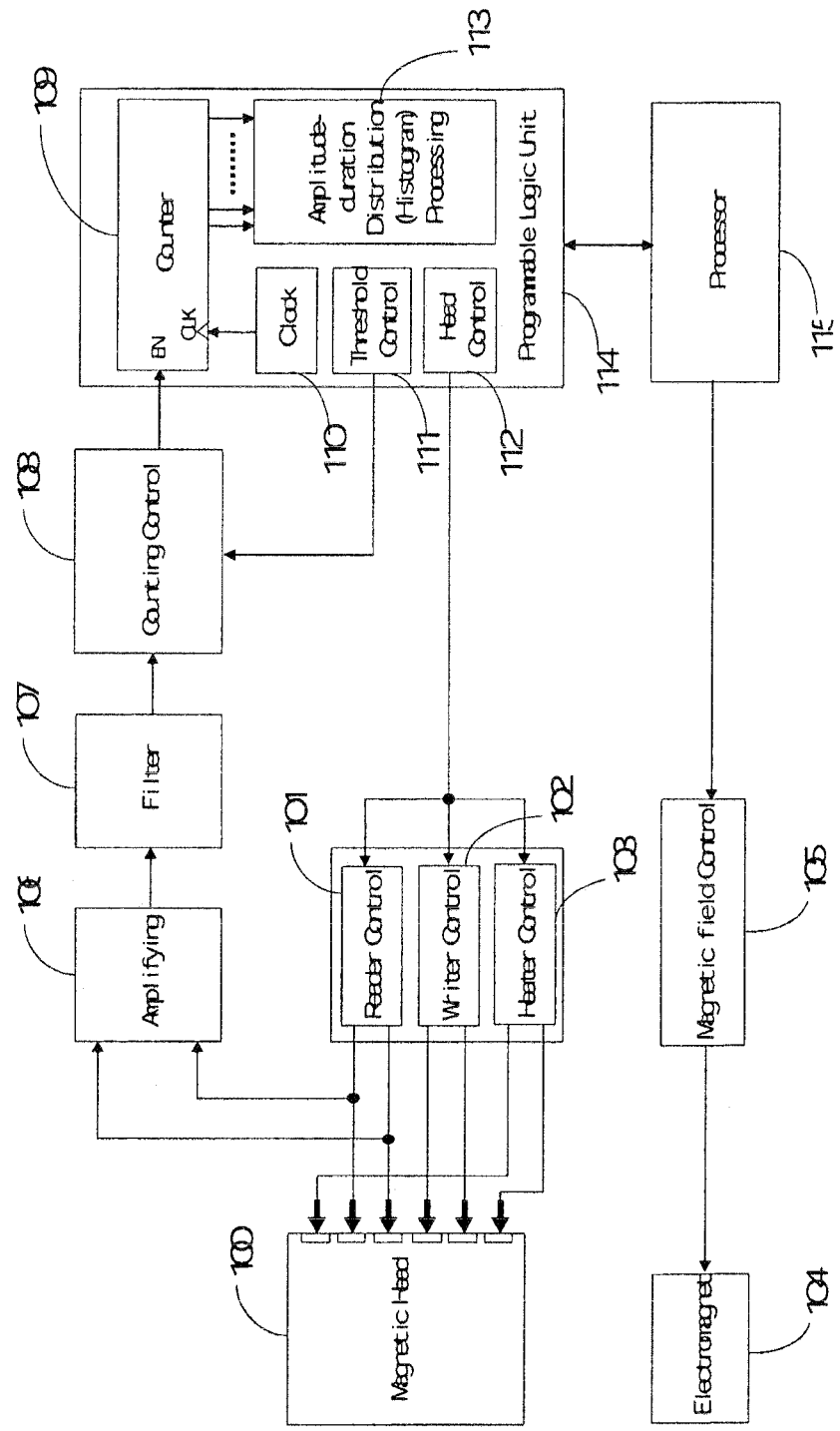
FIG. 1 is a functional block diagram illustrating a preferred embodiment of a system of the present invention.

Various preferred embodiments of the invention will now be described with reference to the figures, wherein like reference numerals designate similar parts throughout the various views.

As indicated above, the present invention provides a method and system for measuring noise of a magnetic head. The magnetic head includes a magnetoresistive (MR) read element, a write element and a heater.

FIG. 1 shows a functional block diagram illustrating a preferred embodiment of a system of the present invention. Now referring to FIG. 1, the system for measuring noise of the magnetic head 100 including a magnetic field generator, a reader control unit 101, an amplifying unit 106, a filter unit 107, a counting control unit 108, a counter unit 109, a threshold control unit 111, a clock unit 110, an amplitude-duration distribution processing module 113 and a processor 115.

In this embodiment, the magnetic field generator includes an electromagnet 104 which is provided as a magnetic field source for producing an external transverse magnetic field to the magnetic head 100 and a magnetic field control unit 105 for controlling the electromagnet 104. In a preferred embodiment, the magnetic field source is an electromagnetic-based field source or a permanent magnet-based field source. The reader control unit 101 is provided for applying bias current or voltage to the read element of the magnetic head 100. Preferably, the system of the present invention further includes a writer control unit 102 and a heater control unit 103, which are used for applying current or voltage to the write element and the heater of the magnetic head 100 respectively, thereby the read element being under a stressed condition such that noise is generated with higher chances in certain problematic magnetic head. The reader control unit 101, writer control unit 102 and heater control unit 103 are controlled by a head control unit 112. The amplifying unit 106 amplifies the output signal from the read element to produce an amplified signal which is sent to the filter unit 107. The filter unit 107 receives the amplified signal to reject all frequency components including the magnetic filed frequency outside a band of frequencies to produce a filtered signal. The counting control unit 108 is provided for generating a plurality of enable signals for a plurality of threshold values which are provided by the threshold control unit 111. The counter unit 109 is provided for measuring the cumulative time duration of each enable signal by counting the cycles of a clock signal provided by the clock unit 110. According to the cumulative time durations and the threshold values, the amplitude-duration distribution processing module 113 generates an amplitude-duration distribution. In this embodiment, the amplitude-duration distribution processing module 113 is implemented by a programmable logic unit 114, thus, the amplitude-duration distribution is made in situ to eliminate the need for further massive data transfer and processing. Preferably, the clock unit 110, threshold control unit 111, head control unit 112 and the counter unit 109 are the modules of the programmable logic unit 114, that is all of them also being implemented by the programmable logic unit 114. Preferably, the programmable logic unit 114 is a programmable logic device or an embedded microprocessor controlled by the processor 115. The processor 115 processes the data received from the programmable logic unit 114 and controls the magnetic field control unit 105. In addition, the processor 115 calculates a plurality of parameters according to the amplitude-duration distribution, analyzes the parameters with a plurality of predetermined criteria and determines the defects of the magnetic head 100.

Figure 2:
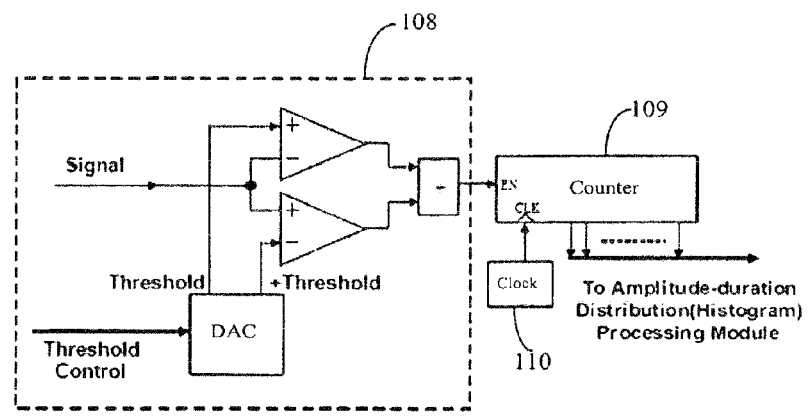
FIG. 2 is a block diagram showing a single-channel counting control unit according an embodiment of the present invention.

Referring to FIG. 2, in an embodiment, the counting control unit 108 comprises a D/A converter for generating various analog signals according to defined threshold values and one couple of analog comparators working together for comparing the amplitude of the filtered signal with the analog signal successively to produce the enable signals.

Figure 3:
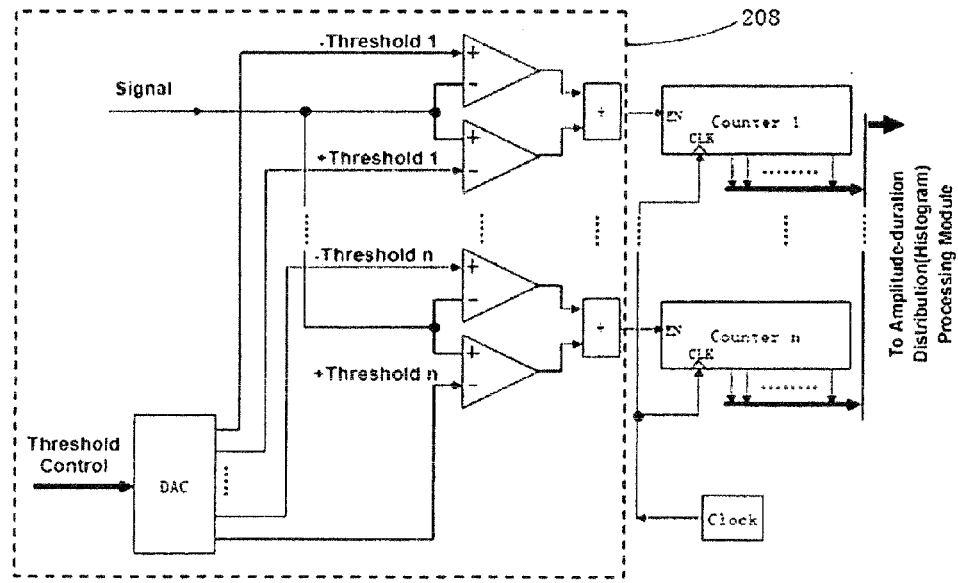
FIG. 3 is a block diagram showing a multiple-channel counting control unit according another embodiment of the present invention.
Figure 4:
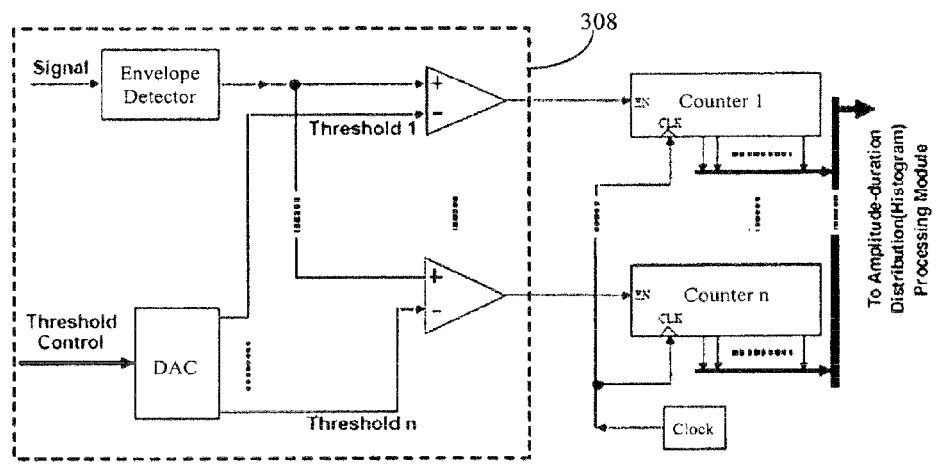
FIG. 4 is a block diagram showing a multiple-channel counting control unit with an envelope detector according another embodiment of the present invention.

Referring to FIG. 3, in another embodiment, the counting control unit 208 is a multiple-channel unit comprising a D/A converter for generating various analog signals according to defined threshold values and several couples of analog comparators for comparing the amplitude of the filtered signal with the analog signals at the same time to reduce the processing time. Accordingly, several counter units are provided to count and store the number of clock cycles generated by the clock unit 110 elapsed during the enable signal generated by the different couples of comparators sustains. As shown in FIG. 4, in another embodiment, the counting control unit 308 further includes an analog envelope detector for obtaining the envelope of the filtered signal.

Figure 5:
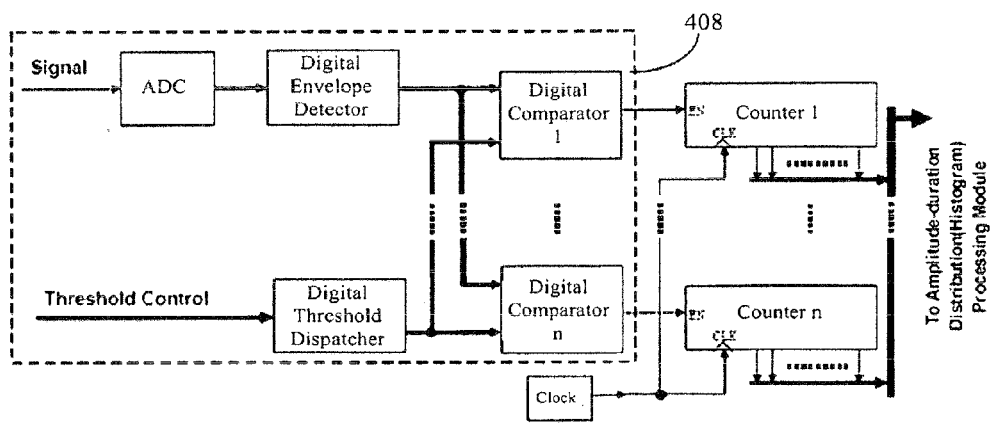
FIG. 5 is a block diagram showing a multiple-channel counting control unit implemented by digital means according another embodiment of the present invention.

Referring to FIG. 5, in still another embodiment, the counting control unit 408 includes an A/D converter for changing the filtered signal to be digital signal, a digital threshold dispatcher for dispatching the threshold values and several digital comparators for comparing the digital signal with the threshold values at the same time to produce the enable signals. Preferably, the counting control unit 408 further comprises a digital envelope detector which is set between the A/D converter and the digital comparators for obtaining the envelope of the digital signal from the A/D converter and then sending it to the digital comparators. In another embodiment, the digital envelope detector and the digital comparator are the modules of the programmable logic unit.

As indicated above, in this system of the present invention, combination of comparator, D/A converter (or A/D converter), counter unit and clock unit are used to implement the time duration measurement, thereby obtaining better performance and higher flexibility. Furthermore, the system of the present invention utilizes programmable logic unit with an amplitude-duration distribution processing module to generate a histogram in situ to save data handling time thereby to reduce the cost.

Figure 6:
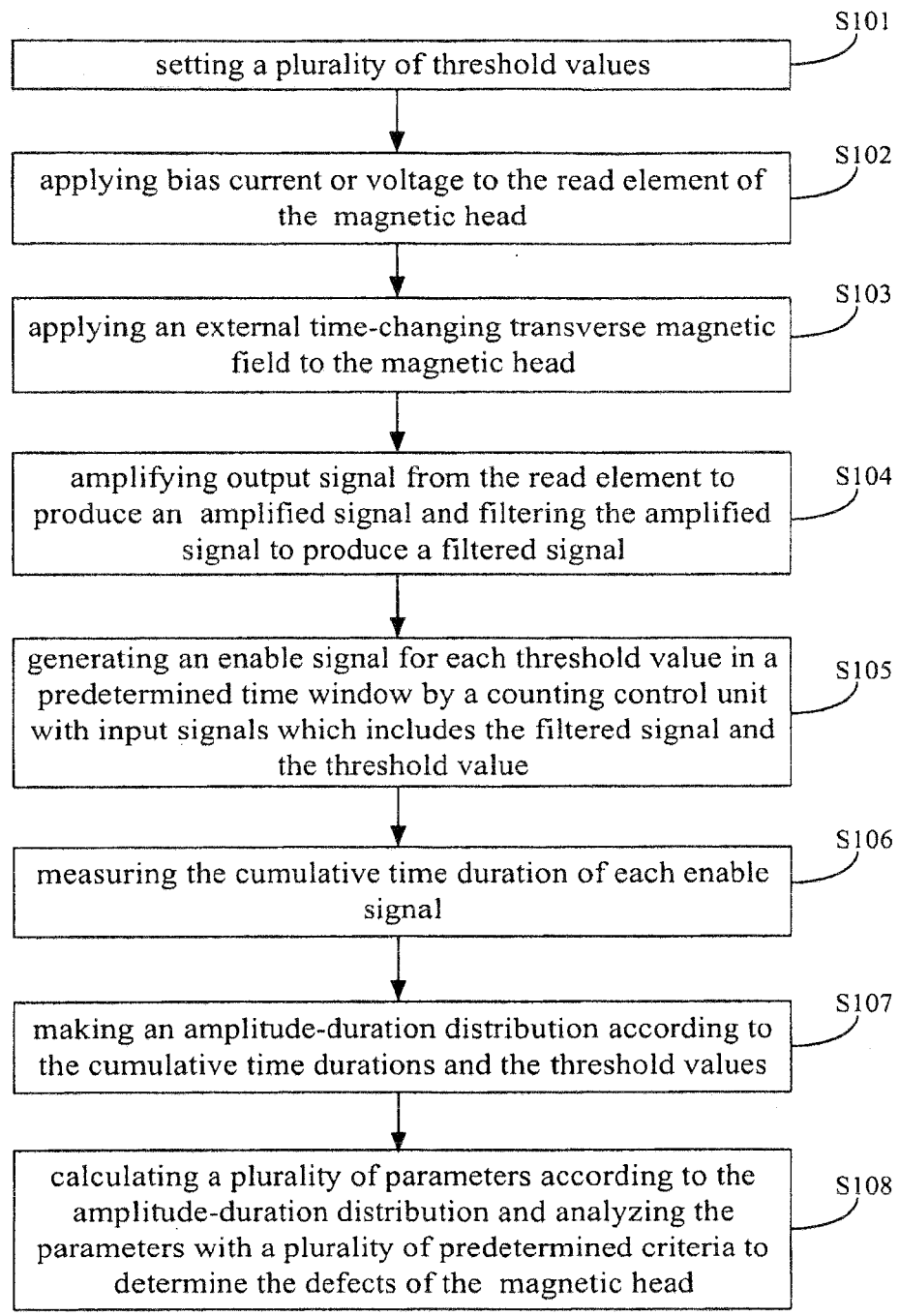
FIG. 6 is a flow chart schematically illustrating a method according to an embodiment of the present invention.

The present invention further provides a method for measuring the noise of the head in an external time-changing transverse magnetic field. In this embodiment, this method is implemented by the system shown in FIG. 1. Now, referring to FIG. 6 and FIG. 1, the method of the present invention includes several steps described as follows.

Figure 7:
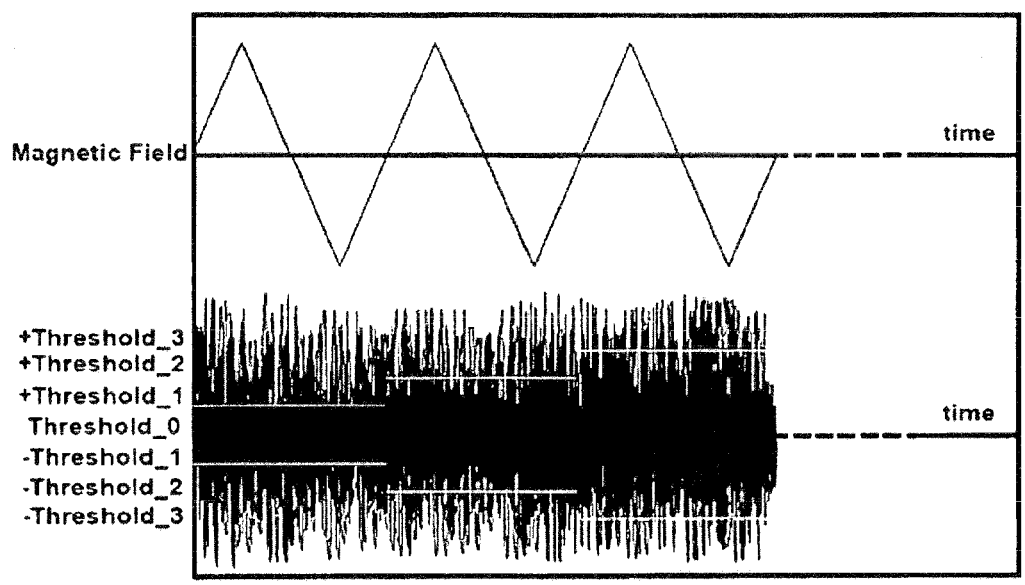
FIG. 7 illustrates multiple thresholds sweeping with multiple magnetic field cycles according to the method shown in FIG. 6.

Step S101 is setting a plurality of threshold values. Step S102 is applying bias current or voltage to the read element of the magnetic head 100. Concretely, the bias current or voltage is produced by the reader control unit 101 controlled by the head control unit 112. Step S103 is applying an external time-changing transverse magnetic field to the magnetic head 100. Preferably, the time-changing transverse magnetic field varies in periodic waveform and varies in single cycle or multiple cycles. As shown in FIG. 7, in this embodiment, the time-changing transverse magnetic field varies in multiple cycles, the threshold values sweep with the time-changing transverse magnetic field. Step S104 is amplifying output signal from the read element to produce an amplified signal and filtering the amplified signal to produce a filtered signal.

Figure 8:
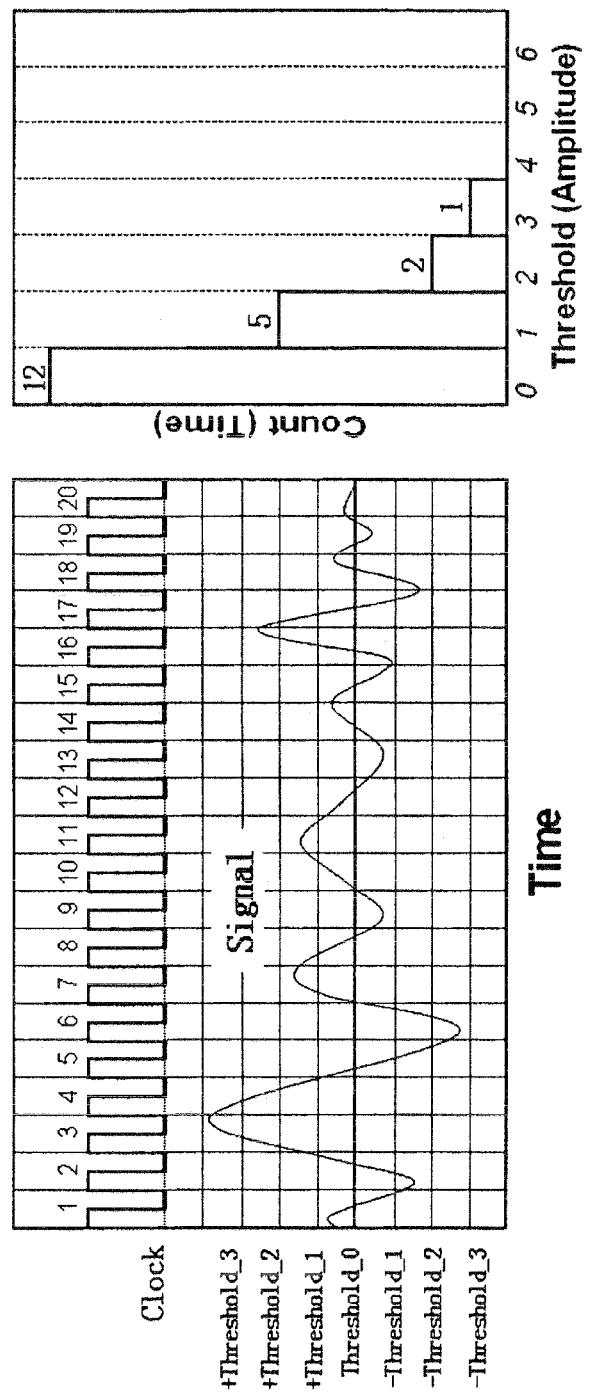
FIG. 8 illustrates how to make the amplitude-duration distribution of the tested signal according to the method shown in FIG. 6.

Step S105 is generating an enable signal for each threshold value in a predetermined time window by a counting control means with input signals which includes the filtered signal and the threshold value. Step S106 is measuring the cumulative time duration of each enable signal. Preferably, measuring the cumulative time duration of each enable signal is implemented by counting the cycles of a clock signal. In an embodiment, the step S105 is implemented by analog means. The counting control means is an analog means shown in FIG. 2, FIG. 3 or FIG. 4. In another embodiment, as shown in FIG. 5, the counting control means is implemented by digital means. Referring to FIG. 8, at these two steps, each threshold value is compared with the amplitude of the filtered signal or the amplitude of the envelope of the filtered signal to produce the enable signal and then the cumulative time duration of the enable signal is measured. In other words, for each threshold value, the cumulative time duration of the tested signal which exceeds the threshold value is measured by counting the cycle of the clock signal. After that, Step S107 is implemented to make an amplitude-duration distribution according to the cumulative time durations and the threshold values.

Figure 9:
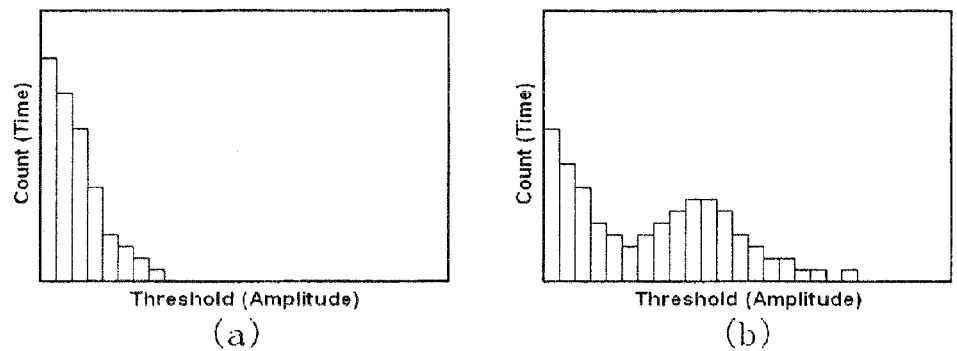
FIG. 9 illustrates two amplitude-duration distributions generated by the method shown in FIG. 6.
Figure 10:
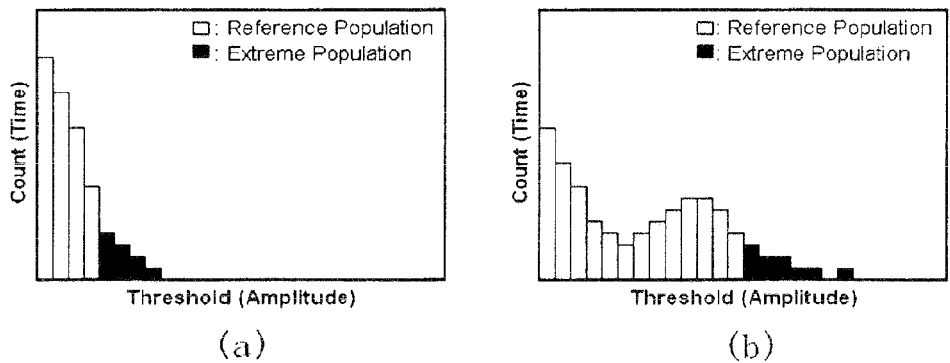
FIG. 10 illustrates each amplitude-duration distribution of FIG. 9 divided into two different parts of the total population.

The last step S108 is calculating a plurality of parameters according to the amplitude-duration distribution and analyzing the parameters with a plurality of predetermined criteria to determine the defects of the magnetic head 100. Preferably, the parameters comprise a plurality of characteristic values of the total population or a part of the total population of the amplitude-duration distribution, referring to FIG. 9 and FIG. 10. FIG. 9 illustrates two amplitude-duration distributions generated by the programmable logic unit 114 according to the method of the present invention. FIG. 10 illustrates each amplitude-duration distribution of FIG. 9 divided into two different parts of the total population, e.g., reference population for reference range and extreme population for extreme-value range to implement more accurate defects identification. Concretely, the characteristic values at least comprise the peak amplitude, the normalized energy, the average amplitude, the RMS and the SNR. In another embodiment, the parameters comprise the relative relations between the characteristic values of a part of the total population of the amplitude-duration distribution and the characteristic values of the total population of the amplitude-duration distribution. In still another embodiment, the parameters comprise the relative relations between the characteristic values of a part of the total population of the amplitude-duration distribution and the characteristic values of another part of the total population of the amplitude-duration distribution. The characteristic values at least comprise the normalized energy and the average amplitude.

As described above, the method of the present invention includes measuring the time durations with a plurality of predetermined thresholds to generate an amplitude-duration distribution (histogram) in real time. For each threshold, measure the time duration of the part of the tested signal which exceeds the predetermined threshold. Thus, based on the amplitude-duration distribution, the instability related noise and background noise of the magnetic head can be measured respectively to identify true defects accurately.

Figure 11:
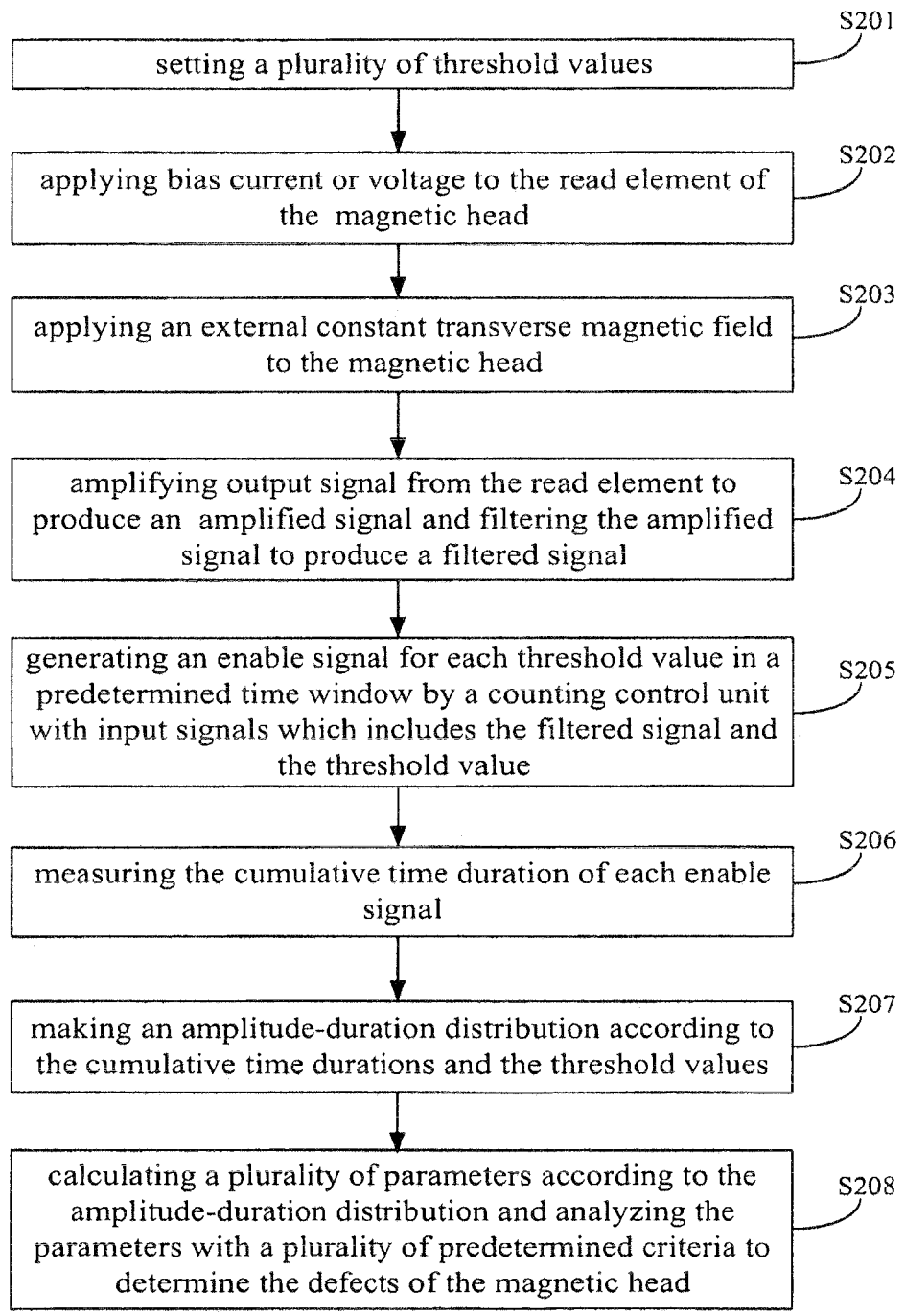
FIG. 11 is a flow chart schematically illustrating another method according to an embodiment of the present invention.

According to an embodiment of the present invention, another method is provided for measuring the noise of the head in a constant magnetic field. This method is similar to the method shown in FIG. 6. Now, referring to FIG. 11, the method of the present invention includes several steps described detail as follows.

Step S201 is setting a plurality of threshold values. Step S202 is applying bias current or voltage to the read element of the magnetic head 100. Step S203 is applying an external constant transverse magnetic field to the magnetic head 100. Preferably, the field intensity of the external constant transverse magnetic field is zero. Step S204 is amplifying output signal from the read element to produce an amplified signal and filtering the amplified signal to produce a filtered signal.

Step S205 is generating an enable signal for each threshold value in a predetermined time window by a counting control means with input signals which includes the filtered signal and the threshold value. Step S206 is measuring the cumulative time duration of each enable signal. Preferably, measuring the cumulative time duration of each enable signal is implemented by counting the cycles of a clock signal. After that, Step S207 is implemented to make an amplitude-duration distribution according to the cumulative time durations and the threshold values. In an embodiment, the step S205 is implemented by analog means. The counting control means is an analog unit shown in FIG. 2, FIG. 3 or FIG. 4. In another embodiment, as shown in FIG. 5, the counting control means is implemented by digital means.

The last step S208 is calculating a plurality of parameters according to the amplitude-duration distribution and analyzing the parameters with a plurality of predetermined criteria to determine the defects of the magnetic head 100. Preferably, the parameters comprise a plurality of characteristic values of the total population or a part of the total population of the amplitude-duration distribution. Concretely, the characteristic values at least comprise the peak amplitude, the normalized energy, the average amplitude, the RMS and the SNR. In another embodiment, the parameters comprise the relative relations between the characteristic values of a part of the total population of the amplitude-duration distribution and the characteristic values of the total population of the amplitude-duration distribution. In still another embodiment, the parameters comprise the relative relations between the characteristic values of a part of the total population of the amplitude-duration distribution and the characteristic values of another part of the total population of the amplitude-duration distribution. The characteristic values at least comprise the normalized energy and the average amplitude.

According to the present invention, still another method is provided for measuring the noise of the head. This method combines the two methods mention above. Thus, both of the magnetic noise and electrical noise can be measured respectively by this method, thereby the true defects of the tested magnetic head can be identified more accurately. The method of the present invention includes implementing the steps S101 to S107 to obtaining plurality of first parameters, implementing the steps S201 to S207 to obtaining plurality of second parameters; analyzing the relationship between the first parameters and the second parameters with a plurality of predetermined criteria to determine the defects of the magnetic head 100.

It should be noted that the counter unit 109, the threshold control unit 111, the clock unit 110 and the head control unit 112 can be implemented by discrete components. It also should be noted that both of the orders of the steps S101 to S103 and the steps S201 to S203 can be changed according the actual operation.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:
1. A method for measuring noise of a magnetic head, comprising:
  obtaining a plurality of first parameters by a method comprising:
    setting a plurality of first threshold values;
    applying first bias current or voltage to a read element of the magnetic head;
    applying an external constant transverse magnetic field to the magnetic head;
    amplifying first output signal from the read element to produce a first amplified signal;
    filtering the first amplified signal to produce a first filtered signal;
    generating a first enable signal for each first threshold value in a predetermined first time window by a counting control means with first input signals which include the first filtered signal and the first threshold value;
    measuring the first cumulative time duration of each first enable signal;

making a first amplitude-duration distribution according to the first cumulative time durations and the first threshold values; and calculating the first parameters according to the first amplitude-duration distribution;

obtaining a plurality of second parameters by a method comprising:

setting a plurality of second threshold values;

applying second bias current or voltage to the read element of the magnetic head;

applying an external time-changing transverse magnetic field to the magnetic head;

amplifying second output signal from the read element to produce a second amplified signal;

filtering the second amplified signal to produce a second filtered signal;

generating a second enable signal for each second threshold value in a predetermined second time window by the counting control means with second input signals which include the second filtered signal and the second threshold value;

measuring the second cumulative time duration of each second enable signal;

making a second amplitude-duration distribution according to the second cumulative time durations and the second threshold values; and calculating the second parameters according to the second amplitude-duration distribution; and analyzing the relationship between the first parameters and the second parameters with a plurality of predetermined criteria to determine the defects of the magnetic head.

2. The method as claimed in claim 1, wherein the field intensity of the external constant transverse magnetic field is zero.

3. The method as claimed in claim 1, wherein the external time-changing transverse magnetic field varies in periodic waveform.

4. The method as claimed in claim 3, wherein the external time-changing transverse magnetic field varies in single cycle or multiple cycles.

5. The method as claimed in claim 1, wherein the counting control means compares the first threshold value with the amplitude of the first filtered signal or the amplitude of the envelope of the first filtered signal to generate the first enable signal and compares the second threshold value with the amplitude of the second filtered signal or the amplitude of the envelope of the second filtered signal to generate the second enable signal.

6. The method as claimed in claim 1, wherein the counting control means is analog means or digital means.

7. The method as claimed in claim 1, wherein measuring the first cumulative time duration of each first enable signal is implemented by counting the cycles of a clock signal.

8. The method as claimed in claim 1, wherein measuring the second cumulative time duration of each second enable signal is implemented by counting the cycles of a clock signal.

9. The method as claimed in claim 1, wherein the first parameters comprise a plurality of characteristic values of the total population or a part of the total population of the first amplitude-duration distribution.

10. The method as claimed in claim 1, wherein the second parameters comprise a plurality of characteristic values of the total population or a part of the total population of the second amplitude-duration distribution.

11. The method as claimed in claim 9, wherein the characteristic values at least comprise the peak amplitude, the normalized energy, the average amplitude, the RMS and the SNR.

* * * * *